US007745522B2

(12) United States Patent
Schneider et al.

(10) Patent No.: US 7,745,522 B2
(45) Date of Patent: Jun. 29, 2010

(54) ACOUSTIC WAVEGUIDE PLATE WITH NONSOLID CORES

(75) Inventors: John K. Schneider, Snyder, NY (US); Jack C. Kitchens, Tonawanda, NY (US)

(73) Assignee: Ultra-Scan Corporation, Amherst, NY (US)

( * ) Notice: Subject to any disclaimer, the term of this patent is extended or adjusted under 35 U.S.C. 154(b) by 0 days.

(21) Appl. No.: 12/055,174

(22) Filed: Mar. 25, 2008

(65) Prior Publication Data

US 2008/0219098 A1 Sep. 11, 2008

Related U.S. Application Data

(63) Continuation-in-part of application No. 11/761,101, filed on Jun. 11, 2007.

(60) Provisional application No. 60/804,412, filed on Jun. 9, 2006.

(51) Int. Cl.
*C08K 5/15* (2006.01)
*G01S 1/72* (2006.01)

(52) U.S. Cl. ...................................... 524/114; 367/117

(58) Field of Classification Search .................. 524/114
See application file for complete search history.

(56) References Cited

U.S. PATENT DOCUMENTS

| | | | | |
|---|---|---|---|---|
| 4,012,650 | A | 3/1977 | Pratt et al. | |
| 4,077,023 | A | 2/1978 | Boyd et al. | |
| 4,742,318 | A | 5/1988 | Jen et al. | |
| 4,743,870 | A | 5/1988 | Jen et al. | |
| 5,005,005 | A | 4/1991 | Brossia et al. | |
| 5,596,671 | A * | 1/1997 | Rockwell, III | 385/147 |
| 5,828,274 | A * | 10/1998 | Jen et al. | 333/143 |
| 2003/0044149 | A1* | 3/2003 | Fraval et al. | 385/125 |
| 2003/0053936 | A1 | 3/2003 | Potyrailo et al. | |
| 2003/0073904 | A1 | 4/2003 | Moriya et al. | |
| 2006/0072875 | A1 | 4/2006 | Bhagavatula et al. | |
| 2008/0219098 | A1 | 9/2008 | Schneider et al. | |

FOREIGN PATENT DOCUMENTS

WO WO 2008/036444 A2 3/2008
WO WO 2008/066956 A2 6/2008

OTHER PUBLICATIONS

UK IPO Search Report for Application No. GB0810621.3, Oct. 7, 2008, Ultra-Scan Corporation.
International Search Report and Written Opinion for PCT/US2007/070873, Apr. 4, 2008, Ultra-Scan Corporation.
Jen; Acoustic Fibers; 1987 IEEE; 1987 Ultrasonics Symposium; pp. 443-454.
Jen, et al.; Clad polymer buffer rods for polymer process monitoring; Ultrasonics 39 (2001); pp. 81-89.
Legros, et al.; Ultrasonic evaluation and application of oriented polymer rods; Ultrasonics 37 (1999); pp. 291-297.
Verdonk; Measurements of Pulse Mode Behavior in Weakly-Clad Silica Waveguides; 1996 IEEE Ultrasonics Symposium; pp. 723-726.
Industrial Materials Institute / National Research Council; Flexible Piezoelectric/Ultrasonic Sensors for Biomedical Applications; Industrial Materials Institute / National Research Council; 1 page.
Industrial Materials Institute / National Research Council; Integrated (IUT) and Flexible Ultrasonic Transducers (FUTs) Technology for Real-Time On-site Nondestructive Evaluation; Industrial Materials Institute / National Research Council; 1 page.
Jen; Similarities and Differences Between Fiber Acoustics and Fiber Optics; 1985 Ultrasonics Symposium; 1985 IEEE; pp. 1128-1133.
Jen et al.; Leaky Modes in Weakly Guiding Fiber Acoustic Waveguides; IEEE Transactions on Ultrasonics, Ferroelectrics, and Frequency Control, vol. UFFC-33, No. 6, Nov. 1986; pp. 634-643.

* cited by examiner

*Primary Examiner*—Ling-Siu Choi
*Assistant Examiner*—Hui Chin
(74) *Attorney, Agent, or Firm*—Hodgson Russ LLP

(57) ABSTRACT

An acoustic (sound or ultrasound) wave transmitter having a plurality of waveguides is described, and a method of making such a transmitter is described. Each waveguide may have a cladded core. The core may be a liquid such as water, alcohol or mineral oil. Alternatively, the core may be a colloidal gel, such as gelatin dissolved in at least one of water, vinyl plastisol or silicone gel. The cladded core is capable of transmitting acoustic wave energy from a first end surface to a second end surface of the cladded core. The waveguides may be substantially fixed relative to each other by a binder. The binder may be formed by fusing the claddings together, potting a material between the waveguides and/or mechanically holding the waveguides.

28 Claims, 5 Drawing Sheets

FULLY FUSED CLADDING

CLADDING UNDERGOING FUSING

SEPARATE CLADDING

CLADDING BUT WITH CONTINUOUS POTTING MATERIAL

SEPARATE CLADDING

ACOUSTIC WAVEGUIDE PLATE WITH NONSOLID CORES

CROSS-REFERENCE TO RELATED APPLICATION

This application is a continuation-in-part of U.S. patent application Ser. No. 11/761,101, which was filed on Jun. 11, 2007, and this application claims the benefit of priority to U.S. patent application Ser. No. 11/761,101. U.S. patent application Ser. No. 11/761,101 claims the benefit of priority to U.S. provisional patent application Ser. No. 60/804,412, which was filed on Jun. 9, 2006. This continuation-in-part patent application also claims the benefit of U.S. patent application 60/804,412.

FIELD OF THE INVENTION

The present invention relates to devices for transmitting information using longitudinal waves, such as sound and ultrasound. The term "acoustic" is used to refer collectively to sound waves and ultrasound waves.

BACKGROUND OF THE INVENTION

It is well known to use acoustic waves, such as ultrasonic energy, to determine information about an object. For example, in non-destructive testing, ultrasonic energy pulses are used to determine whether flaws exist in an object without damaging the object. Ultrasonic energy pulses are also used to obtain information about the friction ridge surfaces, such as fingerprints, of human beings.

To use an ultrasonic energy pulse to obtain information, the pulse must be sent from a device (the "emitter") that is suitable for emitting ultrasonic energy pulses toward an object to be analyzed, and there must be a device (the "receiver") that is suitable for receiving the energy once it has been reflected by or passed through the object. For ease of description, we will discuss the situation in which ultrasonic energy is reflected, but it will be recognized that this description (and the invention) can be applicable to situations in which the detected ultrasonic energy passes through the object being analyzed. Furthermore, in order to illustrate the concepts and ideas, the object being analyzed is from time to time described as a fingerprint, but it will be recognized that the invention is not limited to fingerprints.

When the object being analyzed is a fingerprint, a single device may be used to serve as both the emitter and the receiver. Usually, the emitter and the receiver are positioned some distance from the object being analyzed, and so the emitted ultrasonic energy and the reflected ultrasonic energy must travel through a transmittive substance. Air is a transmittive substance for ultrasonic energy, but other substances transmit ultrasonic energy better than air. One such transmittive substance is mineral oil. Regardless of the choice of transmittive substance, the strength of the ultrasonic energy pulse is weakened and scattered as it passes through the transmittive substance. The result is that by the time the ultrasonic energy arrives at the receiver, the strength of the pulse has greatly diminished.

As a result of scattering caused by the transmittive substance, some of the ultrasonic energy reflected from one part of an object will arrive at a portion of the receiver that is intended for receiving ultrasonic energy from another part of the object. Such scattering tends to reduce the clarity of the information provided by an ultrasonic system.

Traditionally, plastic lenses have been used to collect and focus ultrasonic energy from the image plane of a target object to another image plane where an ultrasonic receiver converts the ultrasonic energy to an electric signal, which then can be used to generate a visual representation of the object. The primary drawbacks in this methodology have been (a) large lens size, and (b) the inability to create short transmission paths for transferring the ultrasonic energy. Additionally, compound lens assemblies must frequently be fabricated to tight mechanical tolerances, which results in increased costs.

The prior art ultrasonic systems would be made more effective if there was a way to transmit ultrasonic energy that had less attenuation of the ultrasonic energy pulse and/or that prevented scattering of the ultrasonic energy pulse.

SUMMARY OF THE INVENTION

The invention may be embodied as an acoustic wave transmitter having a plurality of waveguides. Although this document focuses on ultrasound, this is done to illustrate how the invention might be implemented. The invention is not limited to ultrasound, and it should be recognized that other acoustic waves may be used.

Each waveguide may have a core and cladding. The core may have a first end surface, a second end surface, and a longitudinal surface extending between the first and second end surfaces. The longitudinal surface of the core may be substantially surrounded by the cladding to form a cladded core. The cladded core is capable of transmitting ultrasonic energy from the first end surface to the second end surface.

The waveguides may be substantially fixed relative to each other by a binder. The binder may be formed by fusing the claddings together, potting a material between the waveguides and/or mechanically holding the waveguides.

The core may be a material having a first shear-wave propagation velocity ("SWPV"). The cladding may be a material having a second shear-wave propagation velocity, and the first SWPV is different from the second SWPV. The second SWPV may be greater than the first SWPV.

The waveguide core may be a liquid such as water, alcohol or mineral oil. Since liquids have a shear wave propagation velocity that is or approaches zero, liquids do not propagate shear stresses to the same extent as solids. A resulting advantage of a waveguide having a liquid core may be that there is no low-frequency cut-off or a very low low-frequency cut-off, thereby alleviating a limitation of prior art waveguides.

Alternatively, the waveguide core may be a colloidal gel, such as vinyl plastisol, gelatin dissolved in water, or silicone gel. Although a colloidal gel may have a shear wave propagation velocity that is greater than liquids, its shear wave propagation velocity is less than solids that may be used for the core of a waveguide. An advantage to using a colloidal gel core is that the colloidal gel may be easier to handle than a liquid when fabricating a waveguide since a colloidal gel will not easily leave a tubular cladding. Another advantage of using a colloidal gel for the core is that colloidal gels may have less attenuation of an ultrasonic signal than a core which is a solid material, but a colloidal gel core will have more attenuation than the base liquid that comprises such a gel.

The invention may be embodied as a method of making an acoustic wave transmitter. In one such method, a plurality of cladding tubes are provided. The cladding tubes may be fixed relative to each other, and then the cladding tubes may be filled with a liquid. Ends of the cladding tubes may be sealed so as to prevent the liquid core from leaking out of the cladding tube. In this manner, a plate of waveguides may be formed, wherein each waveguide has: (1) a cladding having (a) a first end surface, (b) a second end surface, and (c) a longitudinal surface extending between the first and second end surfaces, and (2) a liquid core that is substantially surrounded by the cladding. The core may have a first shear-wave propagation velocity ("SWPV"), and the cladding may have a second SWPV. The second SWPV is greater than the first SWPV.

Each of the plurality of cladding tubes may be substantially fixed to at least one other cladding tube. The binding operation may be carried out by heating the cladding tubes in order to fuse each cladding tube to at least one other cladding tube. Also, the binding operation may be carried out by potting the cladding tubes with a suitable potting material placed between the cladding tubes. Also, the binding operation may be carried out by placing a band around the plurality of cladding tubes.

The waveguides may be formed to a desired length. For example, the cladding tubes may be cut prior to or after the binding operation, and/or the plate may be cut or ground to a desired thickness after ends of the cladding tubes are sealed. In one embodiment of the method, the cutting operation is carried out so that the first end surfaces of the cladding tubes lie substantially in a plane. Further, the cutting operation may be carried out so that the second end surfaces of the cladding tubes lie substantially in a different plane.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1A:
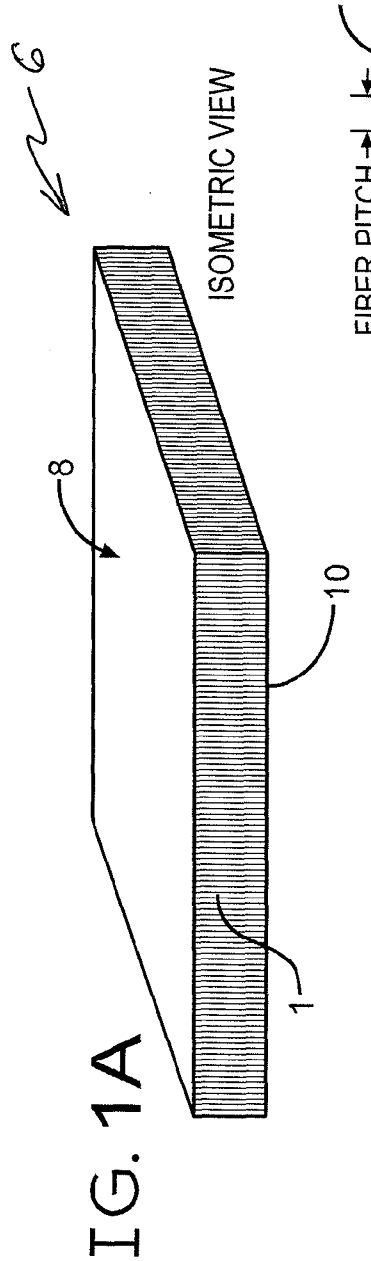
FIG. 1A is an isometric view of an ultrasonic wave transmitter according to the invention.
Figure 1D:
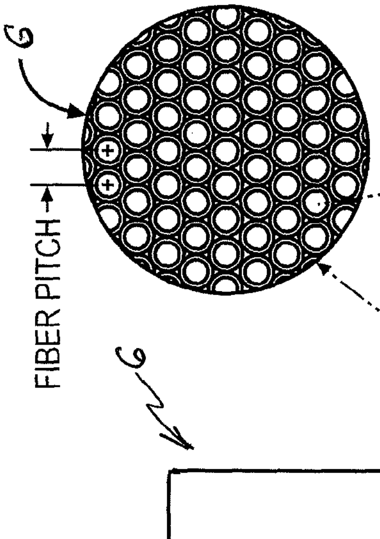
FIG. 1D is an enlarged view of a portion of the transmitter depicted in FIG. 1C.
Figure 1E:
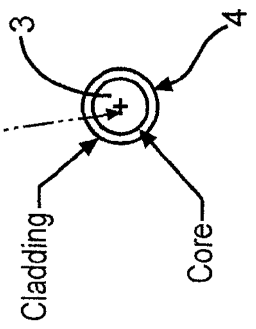
FIG. 1E is an enlarged view of a waveguide depicted in FIG. 1D.
Figure 1C:
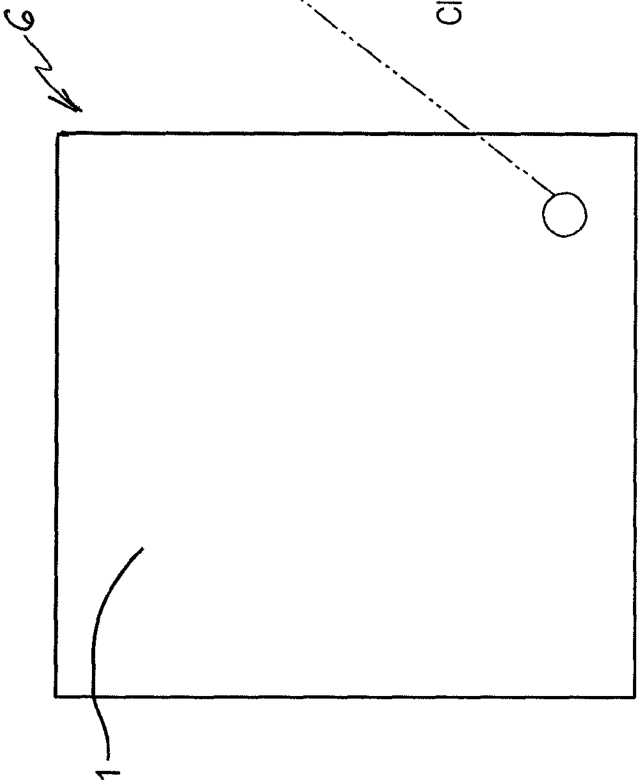
FIG. 1C is a plan view of the transmitter depicted in FIG. 1A.
Figure 1B:
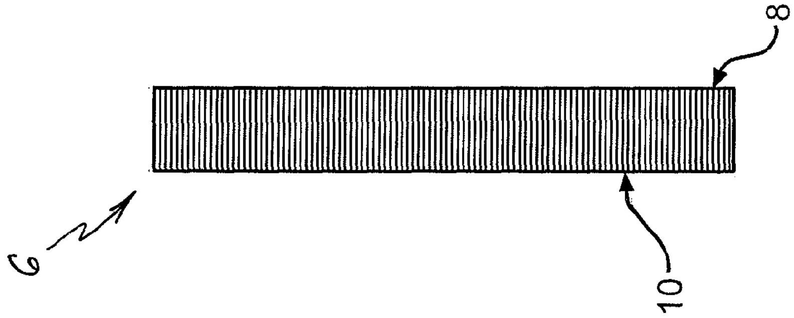
FIG. 1B is a side view of the transmitter depicted in FIG. 1A.

FIGS. 1A through 1E depict an embodiment of the invention in which a plurality of substantially parallel ultrasonic waveguides 1 are held together into a single assembly. The assembly is shown in FIGS. 1A, 1B and 1C as a plate 6 of waveguides 1. The ultrasonic waveguides 1 may be fibers, and may be thought of as conduits that transmit acoustic wave energy, such as ultrasonic energy, from a first end-surface 8 of the waveguide 1 to a second end-surface 10 of the waveguide 1. Each waveguide 1 in the plate 6 may be used to convey a different ultrasonic signal from one side of the plate 6 to the other side. In order to preserve the information being transmitted by the waveguides, the relative positions of the first end-surfaces 8 of the waveguides 1 may be positioned substantially the same as the relative positions of the second end-surfaces 10 of the waveguides 1.

In an embodiment of the invention, an assembly of waveguides 1 is formed so that ultrasonic energy may be conducted from one side of the assembly to the other side. Each waveguide 1 may be constructed to have a core 3 and a cladding 4 substantially surrounding the core. The core 3 may be a liquid and the cladding 4 may be substantially solid. For example, the liquid may be water, alcohol or mineral oil. Alternatively, the core 3 may be a colloidal gel, such as such as vinyl plastisol, gelatin dissolved in water, or silicone gel. The propagation velocity of a shear-wave in the core 3 material should differ from the propagation velocity of a shear-wave in the cladding 4 material so that an ultrasonic wave traveling through the waveguide 1 is substantially contained in the waveguide 1 by means of total internal reflection at the interface of the core 3 and cladding 4. Since ultrasonic energy may be used to transmit information, such as fingerprint information, the invention may be used to transmit information about a pattern (such as a fingerprint) from one side of the plate 6 to another side of the plate 6.

Such a plate 6 may be used, for instance, in ultrasonic fingerprint imaging. In this situation, ultrasonic pulses are reflected from a finger. Generally, the finger is placed on a platen, and when the ultrasonic energy arrives at the finger, all or nearly all of the ultrasonic energy is reflected back from the valleys of the fingerprint. At the ridges of the fingerprint, most of the energy is absorbed by the finger and only a small quantity of ultrasonic energy is reflected back. At the ridge-valley transition region of the fingerprint, the energy reflected back will be between these two values. The detector then measures the amount of energy received, and then a computer translates that value into a grey scale image that is displayed on a monitor. The plate 6 may be placed in the path of the emitted ultrasonic pulse and/or the reflected ultrasonic energy so as to transmit the ultrasonic energy in a manner that minimizes losses and scattering of ultrasonic energy.

Figure 2B:
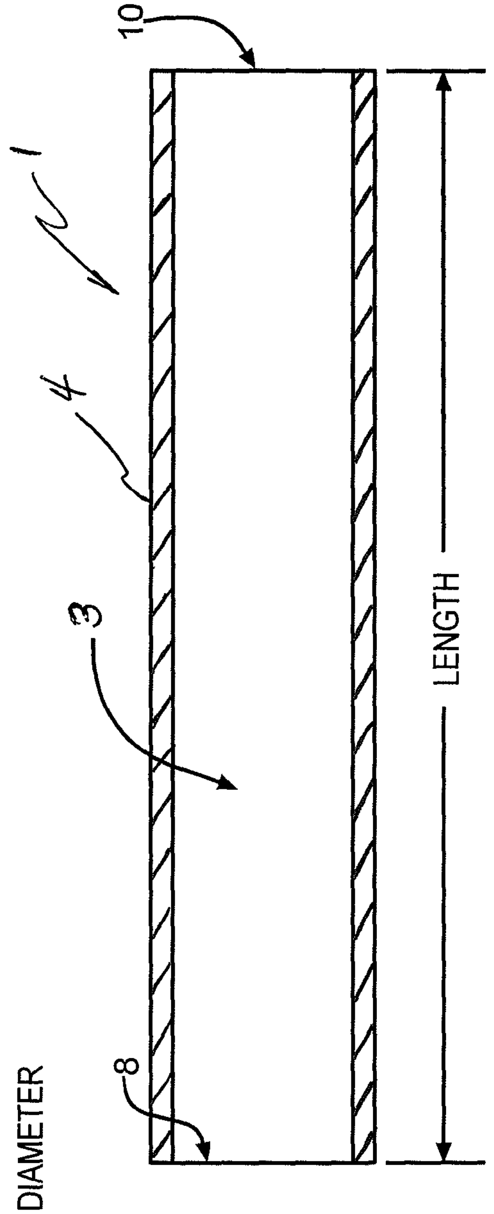
FIG. 2B is a cross-sectional side view of a waveguide taken along the line 2B-2B in FIG. 2A.
Figure 2A:
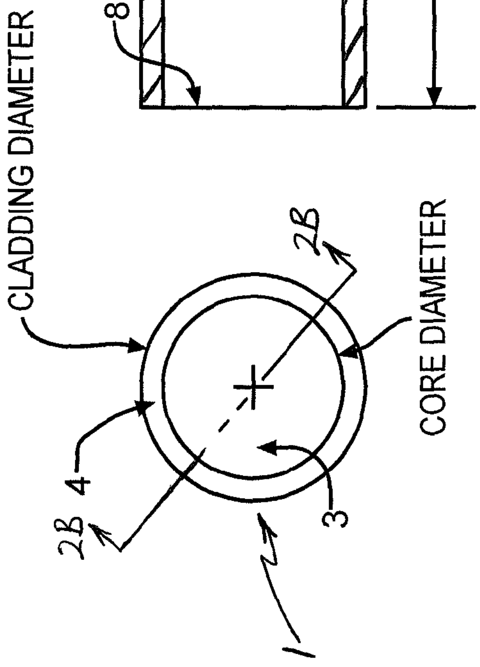
FIG. 2A is an end view of a waveguide.

Having described the invention in general terms, further details are now provided. Each waveguide 1 has a core 3 and cladding 4. FIGS. 2A and 2B depict a waveguide 1. The materials of the core 3 and cladding 4 are selected so that the shear-wave velocity of the cladding 4 is greater than the shear-wave velocity of the core 3. By carefully selecting the core 3 and cladding 4 materials, sound traveling within the waveguide 1 is substantially confined to the core 3.

Under these conditions, acoustic waves, such as ultrasonic waves, are allowed to propagate along the length of the waveguide 1. The core/cladding interface reflects the shear wave. This condition prevents leakage of the wave energy through the cladding. The greater the differences in shear-wave velocities between the core 3 and cladding 4, the thinner the cladding 4 can be. When ultrasonic energy waves are confined primarily to the material of the core 3, external conditions will have little or no significant effect on transmission of the ultrasonic energy.

Furthermore, in order to propagate through the waveguide 1, the ultrasonic energy should have a wavelength corresponding to a frequency that is at or above a cutoff frequency of the waveguide 1. The cutoff frequency for the waveguide 1 can be determined by:

$$f_c = \frac{V_s}{2d}$$

where "$f_c$" is the cutoff frequency, "$V_s$" is the shear velocity (the velocity perpendicular to the longitudinal velocity vector) of the core 3 and "d" is the diameter of the core 3. Based on the relative differences in shear-wave propagation of the core and cladding materials, the ratio of core 3 diameter to the minimum cladding 4 thickness may be determined. For example, the thickness of the cladding may be determined using Bessel functions, or determined empirically by experimentation.

Figure 3:
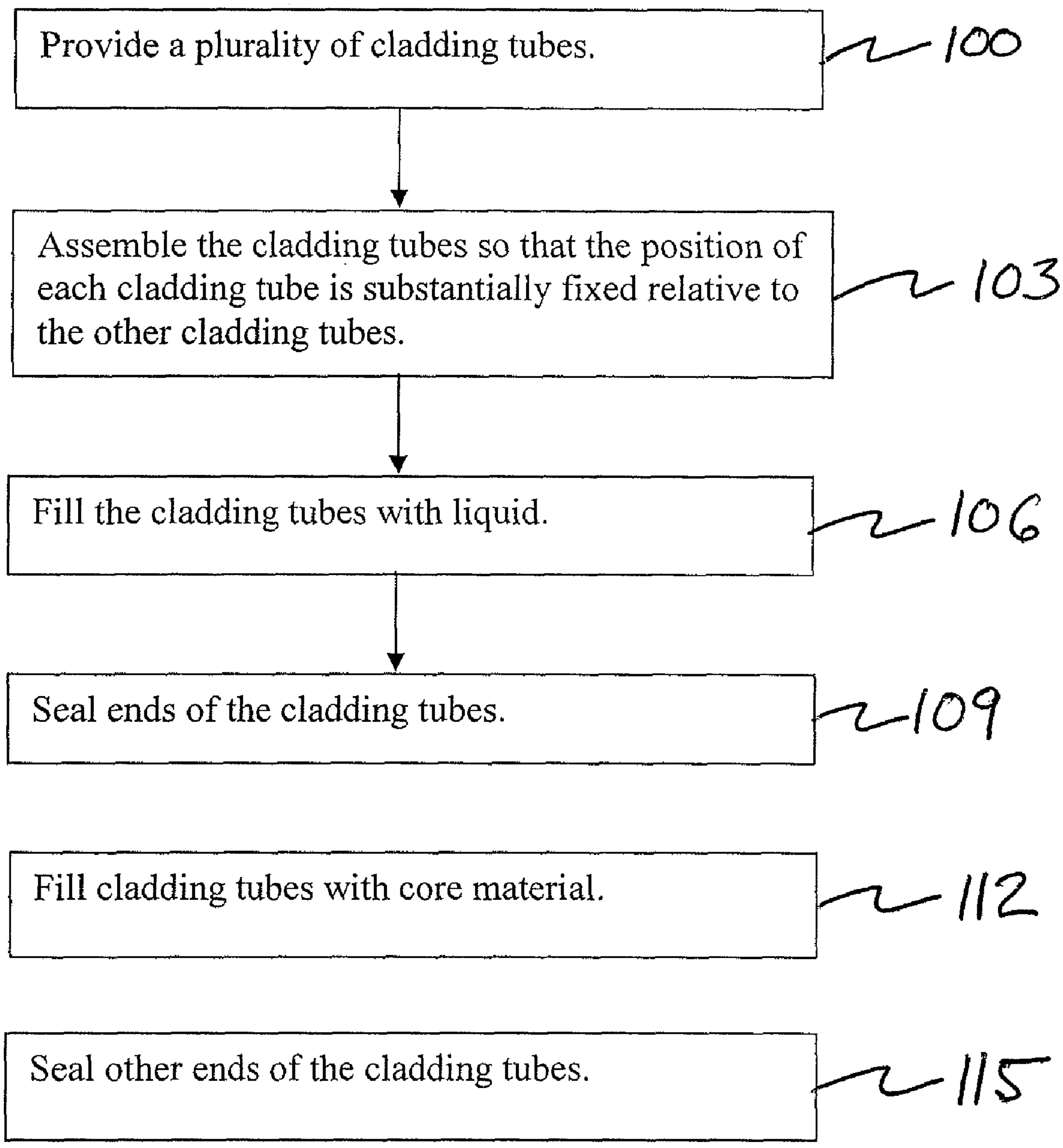
FIG. 3 depicts a method according to the invention.

FIG. 3 depicts a method according to the invention, in which the plurality of waveguides 1 are made into an acoustic wave transmitter. Generally speaking, one method of manufacturing such a wave transmitter starts with providing 100 a plurality of hollow cylinders of the cladding 4 material. Each such cladding tube 4 may be prepared with a desired inner diameter. The plurality of cladding tubes 4 may be assembled 103 into an integral unit so that the position of each cladding tube 4 is substantially fixed relative to the other cladding tubes 4. The cladding tubes 4 may then be filled 106 with a liquid, so that the waveguides 1 have a liquid core. The ends of the cladding tubes 4 may be sealed 109 so that the liquid core is prevented from leaving the cladding tubes 4, thereby forming a plurality of waveguides 1 that have been assembled to form a plate 6. Since the position of the cladding tubes 4 are fixed relative to the other cladding tubes 4, the positions of the waveguides 1 are fixed relative to the other waveguides 1.

Figure 4C:
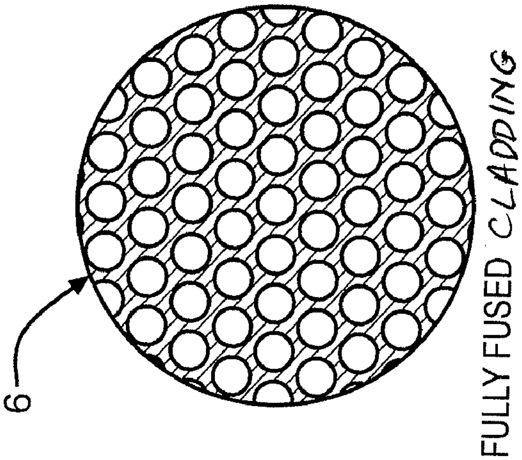
FIG. 4C depicts an assembly of cladding tubes for which the claddings have fused so as to fix the position of the cladding tubes relative to each other.
Figure 4B:
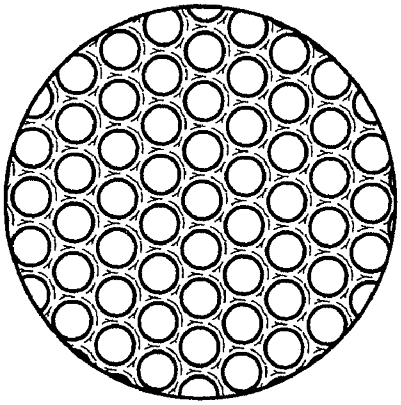
FIG. 4B depicts an assembly of cladding tubes for which the claddings are beginning to fuse.
Figure 4A:
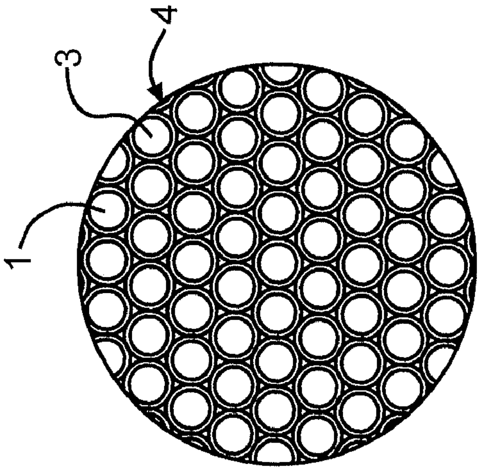
FIG. 4A depicts an assembly of cladding tubes that have not been fixed relative to each other.

The plurality of cladding tubes 4 may be provided by initially forming a length of the tubular cladding material, and then cutting the cladding material so as to provide a plurality of cladding tubes 4 having similar lengths. The plurality of cladding tubes 4 may be provided 100 and carefully placed close to each other in order to provide a bundle of cladding tubes 4. FIG. 4A depicts a bundle of cladding tubes 4. To form the plate 6, the plurality of cladding tubes 4 may be assembled 103 and bound in order to substantially fix each cladding tube 4 to at least one of the other cladding tubes 4 in the bundle. To accomplish this, the bundle may be heated to fuse the cladding tubes 4 to each other, and to exclude interstitial air or gases. FIG. 4B depicts the cladding tubes 4 while the cladding tubes 4 are fusing, and FIG. 4C depicts the cladding tubes 4 once fusing is complete.

Figure 5B:
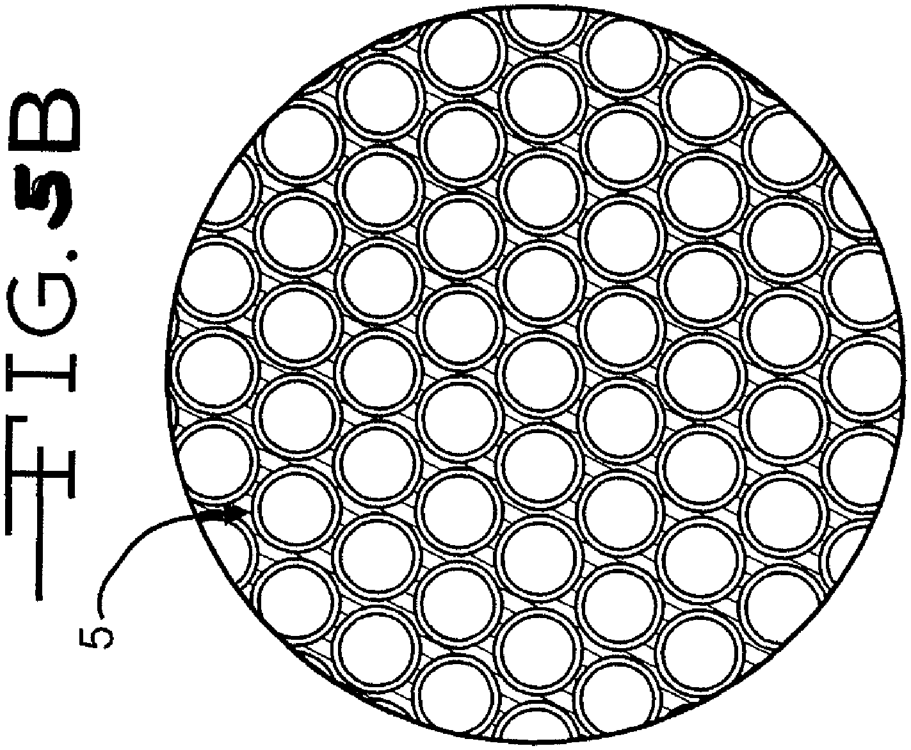
FIG. 5B depicts an assembly of cladding tubes that have been potted so as to fix the position of the cladding tubes relative to each other.
Figure 5A:
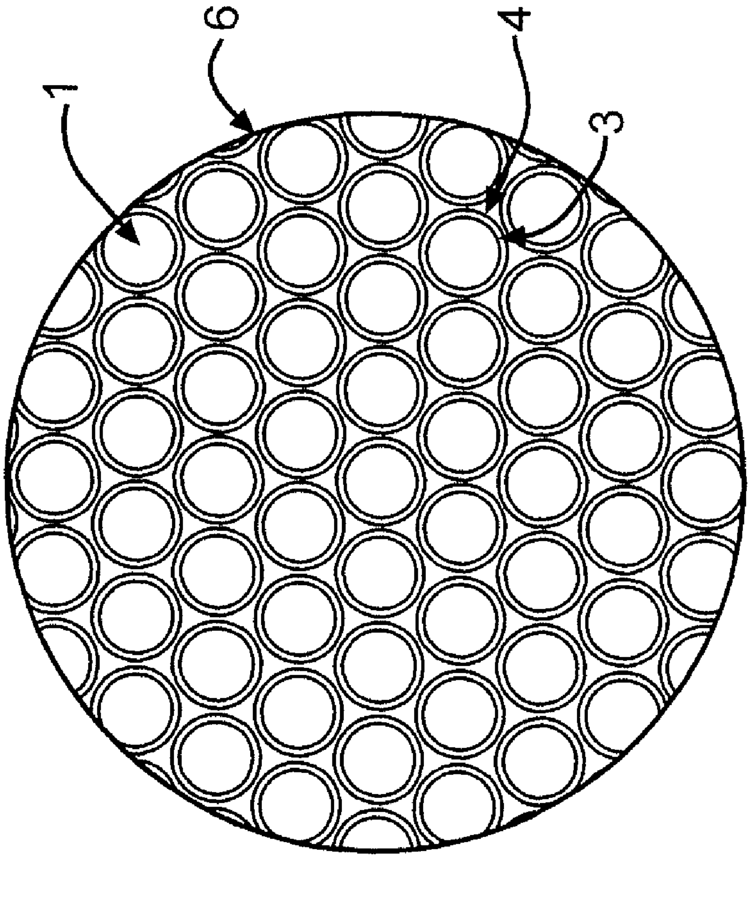
FIG. 5A depicts an assembly of cladding tubes that have not been fixed relative to each other.

Alternatively, the interstices between the cladding tubes 4 may be filled in order to pot the cladding tubes 4 by using a suitable potting compound 5, such as a two part curing resin system. Epoxy resin systems or a room-temperature vulcanizable silicone rubber are two widely known means that may be used as a potting compound 5. FIG. 5A depicts the cladding tubes 4 prior to potting, and FIG. 5B depicts the cladding tubes 4 after potting.

In lieu of (or in addition to) potting or fusing the cladding tubes 4, the cladding tubes 4 may be mechanically constrained so that the end surfaces 8, 10 of the cladding tubes 4 are not permitted to move relative to each other. For example, a tightly drawn band may be used to mechanically constrain the cladding tubes 4.

Once bundled together, the resulting device may be thought of as an assembly having substantially parallel cladding tubes 4, each having a position that is fixed relative to the other cladding tubes 4 in the assembly. The assembly of cladding tubes 4 may be cut perpendicular to the longitudinal axes of the cladding tubes 4 to provide a plate 6 having a desired thickness. In this fashion, the first end-surfaces 8 may lie substantially in a plane. Further, the second end-surfaces 10 may lie substantially in a plane. The end surfaces 8, 10 of the cladding tubes 4 may be polished to a suitable flatness.

Next, a thin material (the "first substrate") may be bonded to one of the end-surfaces 8, 10 of the cladding tubes 4 so as to seal 109 an end of each cladding tube 4. For example, the first substrate may be a film of plastic, such as polystyrene or polycarbonate, 0.0005 to 0.003 inches thick. The first substrate may be bonded to the cladding tubes 4 by an adhesive, such as cyanoacrylate, silicone RTV, or an epoxy. The adhesive may be applied to the cladding tubes 4 by silk screening, brushing or mask spraying the adhesive to the cladding tubes 4.

With one of the end-surfaces 8, 10 sealed by the substrate, the array of cladding tubes 4 may be filled 112 with the core material by submerging the cladding tubes 4 in the liquid or colloidal gel that will become the core 3 for each waveguide 1. To do so, the core material may be provided in a container, and the container with the submerged cladding tubes 4 may be placed in a vacuum chamber to remove gasses in the cladding tubes 4, and replace that gas with the core material in the container. The array of cladding tubes 4 may be removed from the vacuum chamber. Then a small amount of the core material may be placed on the array to assure the cladding tubes 4 are full of the core material prior to sealing 115 another end of the cladding tubes 4 prior to placing a second substrate on the array of cladding tubes 4. Placing the second substrate should be done so as not to trap gas in the cladding tubes 4, and this may be accomplished by performing the procedure in a bath of the core material or simply adding a sufficient quantity of excess core material in order to form a meniscus that can be displaced when the second substrate is applied. The second substrate may be bonded to the cladding tubes 4 in the same manner as the first substrate.

One set of materials that may offer the qualities needed to create an ultrasonic waveguide 1 and ultimately the plate 6 may be water, alcohol or mineral oil for the core 3, and polystyrene ("PS") for the cladding 4. Another polymer that may be used for the cladding is polycarbonate. Further, glass may be used for the cladding. These are only examples of the types of materials that may be used. Other materials can be successfully used to create a suitable ultrasonic waveguide 1.

The plate 6 offers an inexpensive means of transmitting acoustic wave energy from one place to another, and does so with a minimum of signal loss. The plate 6 may be used to transmit ultrasonic energy from an ultrasonic wave emitter, to a finger, and/or from a finger, to an ultrasonic wave receiver, as part of a system for producing a fingerprint image corresponding to the finger. In one such system, an ultrasonic wave guide plate 6 is provided and a finger is placed proximate to a first end surface of the waveguides 1. Ultrasonic energy may be provided by an emitter, and the energy may travel to the finger at least in part via the plate 6. Some of the energy provided to the finger may be reflected back toward the plate 6. The reflected ultrasonic energy from the finger may be received at first end-surfaces 8 of the waveguides 1 and transmitted via the waveguides 1 to the second end-surfaces of the waveguides 1. The ultrasonic energy leaving the second end-surfaces 10 of the waveguides 1 may be provided to a receiver. The receiver may detect the reflected ultrasonic energy received at various locations on the receiver, and convert the ultrasonic energy to one or more electric signals that are indicative of the strength of the received ultrasonic energy signal. The electric signals may be provided to a computer, which has software suitable for interpreting the electric signal and to generate an image of the fingerprint on a monitor.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. An acoustic wave transmitter, comprising:

a plurality of waveguides, each waveguide having a core and cladding, the cladding having (a) a first end surface, (b) a second end surface, and (c) a longitudinal surface extending between the first and second end surfaces, the longitudinal surface substantially surrounding the core to form a cladded core, wherein the core is a liquid material having a first shear-wave propagation velocity ("SWPV") and the core is selected from the group consisting of water, alcohol and mineral oil, and the cladding is a material having a second shear-wave propagation velocity and the cladding is selected from the group consisting of polystyrene, polycarbonate and glass, and wherein the second SWPV is greater than the first SWPV; and a binder holding the waveguides so as to substantially fix each waveguide relative to the other waveguides.

2. The wave transmitter of claim 1, wherein the waveguides are substantially the same length.

3. The wave transmitter of claim 1, wherein the first end surfaces of the waveguides lie substantially in a plane.

4. The wave transmitter of claim 1, wherein the second end surfaces of the waveguides lie substantially in a plane.

5. The wave transmitter of claim 1, wherein the binder is a material substantially the same as the material used for the cladding.

6. The wave transmitter of claim 5, wherein the cladding material also serves as the binder, and the binder has been formed by fusing the cladding of a first waveguide to the cladding of a second waveguide.

7. The wave transmitter of claim 1, wherein the binder has been potted to interstices between the waveguides.

8. A method of making an acoustic wave transmitter, comprising:

providing a plurality of cladding tubes, the tubes being a material selected from the group consisting of polystyrene, polycarbonate and glass;

binding the cladding tubes so as to substantially fix a position of each cladding tube relative to the other cladding tubes;

filling the cladding tubes with liquid selected from the group consisting of water, alcohol and mineral oil;

sealing ends of the cladding tubes so as to provide a plurality of waveguides, each waveguide having a liquid core; and wherein the liquid cores have a first shear-wave propagation velocity ("SWPV"), and the claddings have a second SWPV, wherein the second SWPV is greater than the first SWPV.

9. The method of claim 8, wherein the cladding tubes are made substantially the same length by cutting the cladding tubes to a desired length.

10. The method of claim 8, wherein binding is carried out by heating the cladding tubes to fuse at least one cladding tube to another cladding tube.

11. The method of claim 8, wherein binding is carried out by placing a potting material between the cladding tubes.

12. The method of claim 8, wherein binding is carried out by placing a band around the plurality of cladding tubes.

13. The method of claim 8, further comprising cutting the bound cladding tubes so that the first end surfaces of the cladding tubes lie substantially in a plane.

14. The method of claim 13, further comprising cutting the bound waveguides so that the second end surfaces of the waveguides lie substantially in a plane.

15. An acoustic wave transmitter, comprising:

a plurality of waveguides, each waveguide having a core and cladding, the cladding having (a) a first end surface, (b) a second end surface, and (c) a longitudinal surface extending between the first and second end surfaces, the longitudinal surface substantially surrounding the core to form a cladded core, wherein the core is a colloidal gel having a first shear-wave propagation velocity ("SWPV") wherein the core is a gelatin dissolved in at least one of water, vinyl plastisol or silicone gel, and the cladding is a material having a second shear-wave propagation velocity and the cladding is selected from the group consisting of polystyrene, polycarbonate and glass, and wherein the second SWPV is greater than the first SWPV; and a binder holding the waveguides so as to substantially fix each waveguide relative to the other waveguides.

16. The wave transmitter of claim 15, wherein the waveguides are substantially the same length.

17. The wave transmitter of claim 15, wherein the first end surfaces of the waveguides lie substantially in a plane.

18. The wave transmitter of claim 15, wherein the second end surfaces of the waveguides lie substantially in a plane.

19. The wave transmitter of claim 15, wherein the binder is a material substantially the same as the material used for the cladding.

20. The wave transmitter of claim 19, wherein the cladding material also serves as the binder, and the binder has been formed by fusing the cladding of a first waveguide to the cladding of a second waveguide.

21. The wave transmitter of claim 15, wherein the binder has been potted to interstices between the waveguides.

22. A method of making an acoustic wave transmitter, comprising:

providing a plurality of cladding tubes, the tubes being a material selected from the group consisting of polystyrene, polycarbonate, and glass;

binding the cladding tubes so as to substantially fix a position of each cladding tube relative to the other cladding tubes;

filling the cladding tubes with a colloidal gel, wherein the core is a gelatin dissolved in at least one of water, water and alcohol, vinyl plastisol or silicone gel;

sealing ends of the cladding tubes so as to provide a plurality of waveguides, each waveguide having a colloidal gel core; and wherein the colloidal gel cores have a first shear-wave propagation velocity ("SWPV"), and the claddings have a second SWPV, wherein the second SWPV is greater than the first SWPV.

23. The method of claim 22, wherein the cladding tubes are made substantially the same length by cutting the cladding tubes to a desired length.

24. The method of claim 22, wherein binding is carried out by heating the cladding tubes to fuse at least one cladding tube to another cladding tube.

25. The method of claim 22, wherein binding is carried out by placing a potting material between the cladding tubes.

26. The method of claim 22, wherein binding is carried out by placing a band around the plurality of cladding tubes.

27. The method of claim 22, further comprising cutting the bound cladding tubes so that the first end surfaces of the cladding tubes lie substantially in a plane.

28. The method of claim 27, further comprising cutting the bound waveguides so that the second end surfaces of the waveguides lie substantially in a plane.

* * * * *